Feb. 11, 1969  P. A. MANKIN  3,426,947
SEAL MEANS FOR ELECTRICAL CONDUIT
Filed Sept. 11, 1967
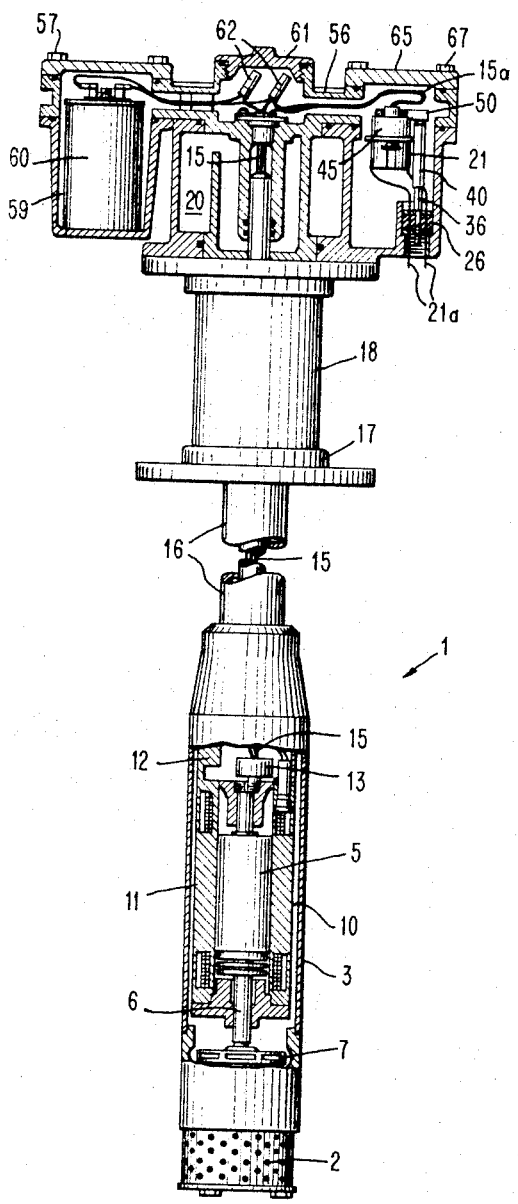
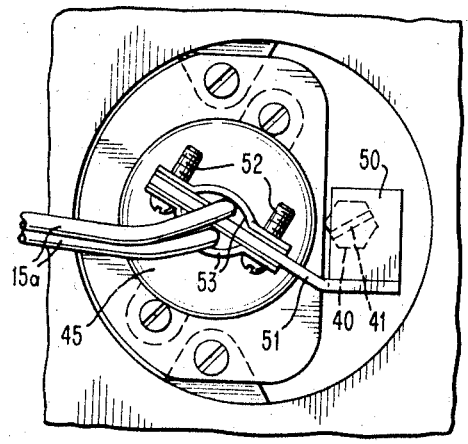
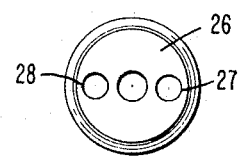
INVENTOR
PAUL A. MANKIN
BY
ATTORNEY United States Patent Office 3,426,947
Patented Feb. 11, 1969

3,426,947
SEAL MEANS FOR ELECTRICAL CONDUIT
Paul A. Mankin, Muskegon, Mich., assignor to John Wood Company, East Orange, N.J., a corporation of Delaware
Filed Sept. 11, 1967, Ser. No. 666,743
U.S. Cl. 222—385
Int. Cl. B67d 5/50; H02g 3/00; F04d 13/08
5 Claims

ABSTRACT OF THE DISCLOSURE

Means to assure that a conduit which houses power inlet wiring to the motor of a submerged pumping means in an underground tank is sealed, to prevent moisture from entering the pump's chambers and cause failure, before an above ground electrical connection can be made to the motor.

Summary of invention

This invention relates to an elastic seal means in a power inlet electrical wiring conduit which must be deformed by manually operated means to cause the elastic seal means to be displaced into hermetically sealing engagement with the inner wall of the conduit before the outer end of the electrical wiring in the conduit can be connected to operate the submerged pump motor.

One object of my invention is to provide a simple obstruction means which must be manually screwed out of obstructing position from a projection rigidly mounted on the connection plug to an electrical source of supply, and which movement causes the seal means to hermetically seal the interior of an electrical conduit for wiring before the connection plug can be inserted into a receptacle to which the wiring for a submerged pump and motor is to be connected.

Another object of my invention is that my improved seal means provides maximum safety when the pump is in operation, by hermetically sealing the electrical conduit against the entrance of moisture, which will prevent moisture from entering the pump's chambers.

Another object of my invention is to provide an elastic seal means which by retraction of the obstruction means therein permits the wiring to be withdrawn through the sealing means, if desired. Heretofore, a molten permanent sealing means was poured around the wiring, to assure that no moisture would enter the conduit. My invention has been approved by the Underwriters' Laboratories, and may be used in lieu of the sealing compound which, when cool, hardens into a rigid mass.

Referring to said drawings:

FIG. 1 is a vertical sectional view, partly in elevation, showing a pumping unit and motor assembly which is adapted to be inserted into an underground tank, with the upper portion of the unit being above ground.

FIG. 2 is a fragmentary enlarged sectional view, showing the obstruction means moved out of position of interference with the projection on an electrical connection plug which movement has caused the elastic member to be moved into sealing relationship with the opening in which the electrical conduit is positioned, and in which position the connection can be made to the receptacle of the wiring to the pump motor.

FIG. 4 is a fragmentary plan view of the supply source connection plug and the extension of the plug overlying the end of the obstruction means used to expand the elastic seal means.

FIG. 5 is a plan view of the elastic seal means, shown in FIGS. 2 and 3.

Figure 2:
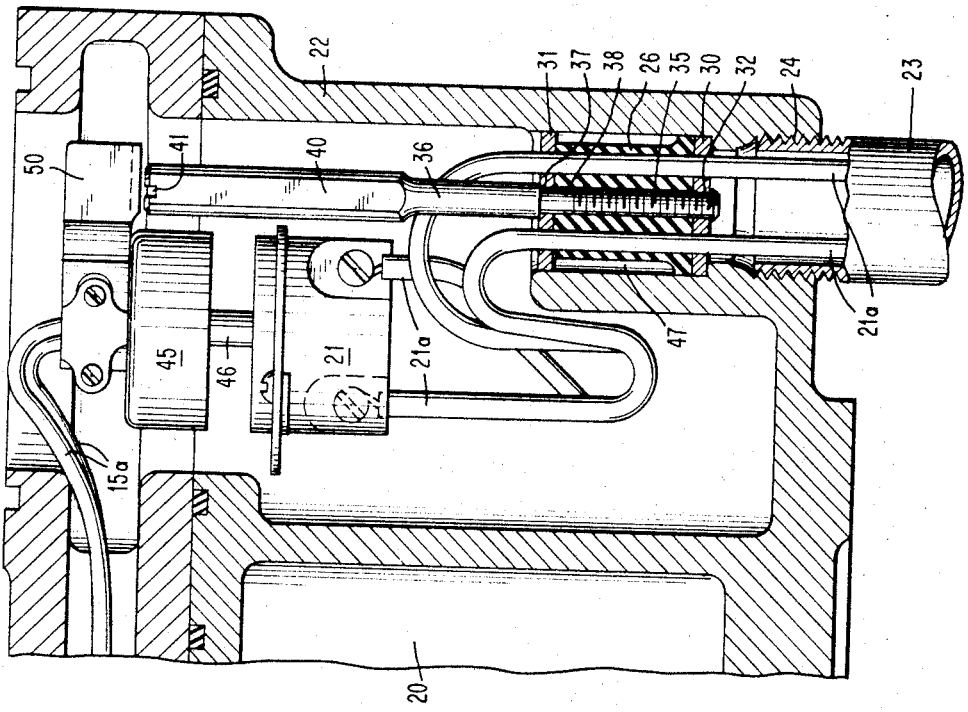

Referring to said drawings; a submerged pumping unit and motor assembly is indicated generally at 1, the lower portion of which is adapted to be inserted into fluid-tight relationship in an opening in an underground tank, such as, for example, is commonly used as a supply tank for gasoline at automobile service stations. Although I describe my invention herein particularly for use in an underground tank for a service station, it is to be understood that my invention may be used in tanks which may be underground or above ground, and tanks which are usable for other purposes.

The structure shown in FIG. 1 is of a type which may be removed as a unit from the underground tank, and which type of unit is in common usage at the present time. The pumping unit and motor assembly may be withdrawn from the tank from the top side without the draining of the pressure lines, which is an important feature from a service standpoint and for testing.

The unit includes at its lowermost end, which is positioned near the bottom of the supply tank, a screen 2 to prevent foreign matter from entering the internal opening through the outer housing), preferably cylindrical. The pumping unit and motor assembly includes a motor 5, the drive shaft 6 of which is rigidly connected to the impellers and diffuser 7 of a centrifugal pump of well-known construction. It is noted that the motor 5 is positioned in spaced relationship with the inner wall of the outer housing 3, so that gasoline, or other fluid, going upwardly through the space 10 between the hermetically sealed housing 11 of the stator of the motor will constantly lubricate the motor. The upper end of the motor 5 is supported by a support member 12 which includes a connection 13 for the electrical wiring 15 for the motor 5 of the pumping unit. The upper portion of the outer conduit of the pumping unit and motor assembly is provided with an enlarged flange member 17 which may be mounted, preferably in a pit, which is accessible at the ground level. The upper end of the pumping unit and motor assembly is connected by a conduit housing support 18 for the discharge head 20 which is connected by suitable piping means and connections, not shown, to gasoline dispensing piping which is connected to a gasoline dispenser of the well-known type located at an island in the service station. As is well-known, such a gasoline dispenser includes a motor switch and a dispensing hose with a manually operated control valve at its distal end, through which gasoline, or other fluid, may be dispensed, for example, into the supply tank of an automobile.

The electrical wiring 15 and 15ª connects the pump motor 5 to the receptacle 21 positioned in the junction box and discharge head 22. The receptacle 21 is connected by suitable wiring 21ª to a source of power supply, said wiring 21ª being housed in an electrical conduit 23, the upper end of which is screw-threaded and rigidly connected as at 24 to a screw-threaded opening in the bottom wall of the junction box 22.

The conduit seal means per se includes a rubber, real or synthetic elastomer, elastic material plug 26 which has openings 27 and 28 therethrough for the electrical wiring 21ª. The plug is provided at its bottom end with a disc 30 and at its upper end with a similar disc 31. The disc 30 is provided with an axial screw-threaded opening 32 therein, which is adapted to receive the screw-threaded end 35 of the obstruction safety member 36. The upper disc 31 correspondingly is provided with an opening 37 which is adapted to receive the unthreaded upper end of the reduced portion 38 at the lower end of the member 36. The upper end of the member 36 is enlarged, as shown at 40, in FIGS. 1, 2, and 3, and the upper end of the enlarged portion 40 is provided, conveniently, with a slot 41 for insertion therein of a screw driver, or may be provided by any of the well-known means by which the member 36 can be rotatatingly moved.

Figure 3:
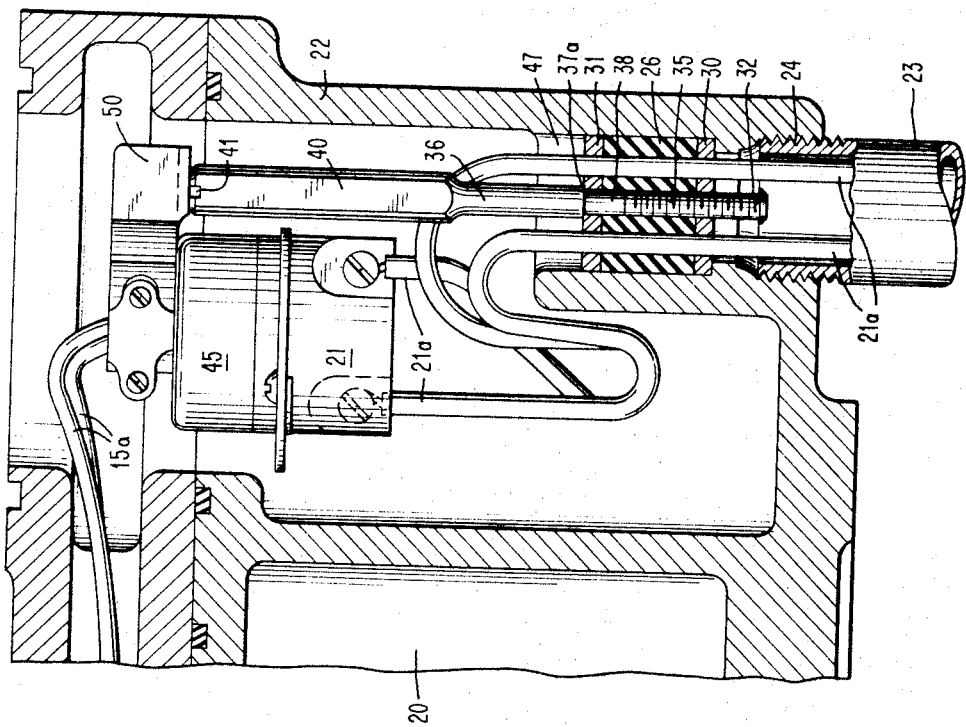
FIG. 3 is a view similar to FIG. 2, but with the obstruction means shown in interfering position, so that the connection plug to the electrical source of supply cannot be moved into position in the receptacle.

As shown in FIG. 3, before the member 36 has been screwed downwardly to expand the elastic plug 26, the upper end of the enlarged portion 40 provides an obstruction which will prevent the plug 45, connected by suitable wiring 15a to the motor, from being inserted into the receptable 21. In order to insert the prongs 46 of the connection plug 45 into matching openings in the receptacle 21 in the well-known manner, the obstructing member 36 must be manually screwed downwardly, which will deform the elastic plug 26 by pressure on the member 26 in engagement at its top surface with the upper disc member 31. Such screw-threaded downward movement of the member 36 will displace the elastic seal member 26 from the form shown in FIG. 3 to the form shown in FIG. 2, and when so displaced to the form shown in FIG. 2, the elastic member 26 will hermetically seal the opening 47 to prevent any moisture from passing through the opening 47 and into the pump's chambers.

When the member 40 has been screwed down far enough to completely deform the elastic member 26 into the hermetically sealed position in the opening 47, the upper end 40 of the member 36 will have been moved out of obstructing position to the L-shaped member 50 which is formed as a rigid part of the connection plug 45. As best shown in FIG. 5, the L-shaped member 50 is conveniently provided with an angular extension arm 51 which is rigidly clamped to the plug 45 by screw means 52 extending through brackets 53 on the plug 45 which are bowed at their center portion to permit the wiring 15a to be connected to the plug 45.

The junction box and discharge head 22 is provided with a removable cover member 56 which is rigidly fastened by bolt members 57 which extend through the cover member 56 and into engaging matching screw-threaded openings in the junction box and discharge head 22. The junction box and discharge head 22 is also provided with a separate chamber 59 for a capacitor 60.

I also find it convenient to include in the cover member an axially positioned separate screw cap member 61 which, when removed, will permit access to the connectors 62 for the wiring. The junction box and discharge head 22 may be provided with gasketing means to assure that the cover is in fluid-tight relationship with the junction box and discharge head. I also find it convenient to provide a separate cover 65 which is secured to the junction box and discharge head 22 by means of bolts 67, which cover 65 may be removed to permit access to the connecting plug 45 and the obstruction member 36 for the displacement of the elastic sealing member 26.

*Operation*

Assuming that the submerged pumping unit and motor assembly indicated at 1 has been rigidly connected to an opening in an underground tank, with the upper portion thereof mounted in a pit at ground level, and with the obstruction member 36 in the position shown in FIG. 3; the cover 65, is removed to permit access to the connection plug 45 and the receptacle 21. When in the position shown in FIG. 3 it would be impossible to insert the prongs 46 of the connection plug 45 into the corresponding openings in the receptacle 21. The installer inserts a screw driver into the slot 41 in the upper portion 40 of the obstruction member 36, or uses a socket wrench, etc., to turn the screw-threaded end 35 of the member 36 in the screw-threaded opening 32 in the lower disc 30. The shoulder 37a in contact with the upper surface of the upper disc 31 forces the disc 31 downwardly and displaces the elastic material 26 from the form shown in FIG. 3 to the form shown in FIG. 2, and wherein the elastic material plug 26 hermetically sealingly engages the wall of the opening 47 to hermetically seal the opening 47 to prevent any moisture from passing therethrough.

The downward movement of the obstruction member 36 will move the top portion 40 of the member 36 downwardly a sufficient amount to permit the prongs 46 to be inserted in the matching openings in the receptacle 21 to thereby make electrical contact with the source of supply.

It is to be noted as heretofore stated that the gasoline dispenser on the island is provided with switch means, which are connected by suitable wiring to either the wiring 21a or the wiring 15a, so that the electrical circuit to the motor 5 may be opened and closed by operation of the well-known switch means included in a gasoline dispenser.

I claim:
1. In a remote system for a fuel service station which includes a pumping unit and motor assembly inserted in fluid-tight relationship into a tank source of fuel supply through an opening in said tank and including a junction box and discharge head accessible at ground level; comprising a tubular housing for a pumping unit and motor assembly and electrical wiring connections thereto; a junction box and discharge head assembly connected at the upper end of said tubular housing, said motor electrical wiring extending through said tubular housing to a connection plug adapted to be inserted in a receptacle in said junction box; electrical wiring connecting said receptacle to a source of electrical supply; a rigid member projecting from said connection plug; an elastic seal member positioned in an opening, having a bottom annular ledge, in said junction box, said electrical wiring from said receptacle to said source of supply extending through openings formed in said elastic seal member; an obstruction safety member in screw-threaded relation to said elastic seal member, downward movement of said screw-threaded member being adapted to deform said elastic seal member into hermetically sealing relationship in said opening; the upper end of said obsrtuction member being adapted to engage said rigid member projection on said connection plug and prevent said connection plug from being operatively connected to said receptacle unless and until said obstruction member has been screwed downwardly into said elastic seal member to a sufficient extent to hermetically seal said elastic seal member in said opening, and to simultaneously move said upper end of said obstruction member out of obstructing position in relationship to said rigid projection on said connection plug to permit the prongs of said connection member to be inserted into matching openings in said receptacle, and to thereby effect an electrical connection means between said wiring for said motor and said wiring connections to said electrical source of supply.

2. A remote system as in claim 1; wherein said elastic seal member is provided with a rigid disc in engagement with the top surface of said elastic seal member and with a rigid disc member in engagement with the bottom surface of said elastic seal member, both of said discs and said elastic seal member having axially aligned openings therethrough, and with the opening in said disc in engagement with the bottom surface of said elastic seal member being screw-thereaded; and wherein the lower end of said obstruction member is screw-threaded and engaged in said screw-threaded opening in said bottom disc.

3. In a remote system for a fuel service station which includes a pumping unit and motor assembly inserted in fluid-tight relationship into a tank source of fuel supply through an opening in said tank and including a junction box and discharge head accessible at ground level; comprising a tubular housing for a pumping unit and motor assembly and electrical wiring connections thereto; a junction box and discharge head assembly connected at the upper end of said tubular housing, said motor electrical wiring extending through said tubular housing to a connection plug adapted to be inserted in a receptacle in said junction box; electrical wiring connecting said receptacle to a source of electrcal supply; a rigid member projection from said connection plug; an elastic seal member positioned in an opening, having a bottom annular ledge, in said junction box, said electrical wiring from said receptacle to said source of supply extending through openings formed in said elastic seal member; an obstruction safety member having an enlarged upper portion and a reduced diameter lower end in screw-threaded relation at said lower end to said elastic seal member, downward movement of said screw-threaded lower end of said obstruction member being adapted to deform said elastic seal member into hermetically sealing relationship in said opening; the upper end of said obstruction member being adapted to engage said rigid member projection on said connection plug and prevent said connection plug from being operatively connected to said receptacle unless and until said obstruction member has been screwed downwardly into said elastic seal member to a sufficient extent to hermetically seal said elastic seal member in said opening, and to simultaneously move said upper end of said obstruction member out of obstructing position in relationship to said rigid projection on said connection plug to permit the prongs of said connection member to be inserted into matching openings in said receptacle, and to thereby effect an electrical connection means between said wiring for said motor and said wiring connections to said electrical source of supply.

4. A remote system as in claim 3; wherein said seal member is provided with rigid discs respectively in engagement with the top surface and the bottom surface of said elastic seal member, both of said discs and said elastic seal member having axially aligned openings therethrough, and with the disc in engagement with the bottom surface of said elastic seal member being screw-threaded and in engagement with the screw-threaded lower end of said obstruction member; the peripheral bottom surface of said last named disc being in engagement with said annular ledge; and wherein the enlarged upper portion of said obstruction member and its reduced diameter lower end form a shoulder which engages the top surface of said rigid disc in engagement with the top surface of said elastic seal member; whereby, said elastic seal member is deformed outwardly between said discs when said obstruction member is screwed downwardly.

5. In a remote system for a fuel service station which includes a pumping unit and motor assembly inserted in fluid-tight relationship into a tank source of fuel supply through an opening in said tank and including a junction box and discharge head accessible at ground level; comprising a tubular housing for a pumping unit and motor assembly and electrical wiring connections thereto; a junction box and discharge head assembly connected at the upper end of said tubular housing, said motor electrical wiring extending through said tubular housing to a connection plug adapted to be inserted in a receptacle in said junction box; electrical wiring connecting said receptacle to a source of electrical supply; a rigid member projecting from said connection plug; an elastic seal member positioned in an opening, having a bottom annular ledge, in said junction box, said electrical wiring from said receptacle to said source of supply extending through openings formed in said elastic seal member; an obstruction safety member in screw-threaded relation to said elastic seal member, downward movement of said screw-threaded member being adapted to deform said elastic seal member into hermetically sealing relationship in said opening; the upper end of said obstruction member being adapted to engage said rigid member projection on said connection plug and prevent said connection plug from being operatively connected to said receptacle unless and until said obstruction member has been screwed downwardly into said elastic seal member to a sufficient extent to hermetically seal said elastic seal member in said opening, and to simultaneously move said upper end of said obstruction member out of obstructing position in relationship to said rigid projection on said connection plug to permit the prongs of said connection member to be inserted into matching openings in said receptacle, and to thereby effect an electrical connection means between said wiring for said motor and said wiring connections to said electrical source of supply; and a separate removable cover for said junction box rigidly secured by screw means to said junction box and discharge head assembly, said separate cover when removed permitting ready access to said connection plug and said receptacle.

References Cited
UNITED STATES PATENTS

| | | | |
|---|---|---|---|
| 2,689,529 | 9/1954 | Wightman | 103—87 |
| 2,840,119 | 6/1958 | Gavin | 222—385 XR |
| 2,897,763 | 8/1959 | Wright | 103—87 |
| 2,913,987 | 11/1959 | Clymer | 174—86 XR |
| 2,935,025 | 5/1960 | Wright et al. | 103—87 |
| 3,081,915 | 3/1963 | Patterson et al. | 222—385 XR |
| 3,092,290 | 6/1963 | Hoelle | 222—385 XR |

WALTER SOBIN, *Primary Examiner.*

U.S. Cl. X.R.

174—70; 103—87